United States Patent
Pasetti et al.

(10) Patent No.: US 6,678,377 B1
(45) Date of Patent: Jan. 13, 2004

(54) MONOLITHICALLY INTEGRATED TELEPHONE CIRCUIT FOR DRIVING WIDE-BAND TELEPHONE LINES FOR DATA TRANSMISSION

(75) Inventors: Mauro Pasetti, Milan (IT); Carlo Maria Milanese, Olevano di Lomellina (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/476,487

(22) Filed: Dec. 30, 1999

(30) Foreign Application Priority Data

Dec. 31, 1998 (EP) .............................. 98830810

(51) Int. Cl.[7] .......................... H04M 1/00; H04M 9/00; H04M 9/08
(52) U.S. Cl. ............. 379/413; 379/399.01; 379/413.01; 379/413.02
(58) Field of Search .................................. 379/322, 323, 379/324, 399.01, 399.02, 401, 403–404, 413, 413.01–413.02

(56) References Cited

U.S. PATENT DOCUMENTS

| | | | | |
|---|---|---|---|---|
| 4,961,219 A | * | 10/1990 | Patel | |
| 5,347,577 A | * | 9/1994 | Takato et al. | |
| 5,428,682 A | * | 6/1995 | Apfel | |
| 5,659,610 A | * | 8/1997 | Schorr et al. | |
| 5,661,794 A | * | 8/1997 | Rosch et al. | |

FOREIGN PATENT DOCUMENTS

| | | |
|---|---|---|
| EP | 0 446 944 A2 | 9/1991 |
| EP | 0 543 161 A2 | 5/1993 |
| EP | 0 637 161 A1 | 2/1995 |
| WO | WO 94/17619 | 8/1994 |

* cited by examiner

*Primary Examiner*—Duc Nguyen
(74) *Attorney, Agent, or Firm*—Lisa K. Jorgenson; Robert Iannucci; Seed IP Law Group PLLC

(57) ABSTRACT

The invention relates to a monolithically integrated telephone circuit for driving wide-band telephone lines and transmitting digital data at a very high frequency. The telephone circuit is powered from a battery DC supply providing a pair of voltage references. The telephone circuit includes an output circuit portion including a pair of differential output stages, each having a pair of inputs and being connected with its output to a respective lead of a two-wire telephone line. The telephone circuit also includes a device for deriving a reference voltage from the supply voltage, and includes a low-voltage supply network which is input a DC signal and produces a voltage reference to be added to the reference voltage for delivery to one input of each output stage. The other input of each stage receives an AC signal in order to present at the circuit output a suitable AC+DC differential voltage for driving the telephone line.

17 Claims, 2 Drawing Sheets

DC input/output characteristic

MONOLITHICALLY INTEGRATED TELEPHONE CIRCUIT FOR DRIVING WIDE-BAND TELEPHONE LINES FOR DATA TRANSMISSION

FIELD OF THE INVENTION

This invention relates to an integrated interface circuit for driving a subscriber's telephone line, being of the type which includes at least one output stage connected to the telephone line, and specifically to driving wide-band telephone lines and transmitting digital data at a very high frequency.

BACKGROUND OF THE INVENTION

Embodiments of the invention relate to a monolithically integrated circuit for driving wide-band telephone lines and transmitting digital data at a very high frequency. The circuit is powered from a battery DC supply providing a pair of voltage references and comprises an output circuit portion including a pair of differential output stages. Each stage has a pair of inputs and being connected with its output to a respective lead of a two-wire telephone line.

This invention is applicable, in particular, to interface telephone circuits for driving the lines linked to subscribers' phone sets, but nothing in this description should limit the scope of the invention or the claims to only that field.

These interface circuits, e.g., of the type known as SLICs (Subscriber Line Interface Circuits) in the trade, are connected between the subscriber's telephone lines and the exchange internal circuitry, and are adapted to supply the telephone line with a predetermined line voltage and current dependent on the line resistive load.

There exists a demand in this field for telephone line communications of improved quality, as well as for a wider range of subscriber services. For example, services are currently being offered which involve transmission of digital information over the telephone lines.

Continued improvement in the quality of telephone line transmission is needed to fill such demands involving increased sophistication.

Since the inception of Internet and other digital communications facilities utilizing the telephone line pair for data transmission, it became necessary to remove current restrictions on the rate of data transmission using 64 kbits/sec speech modems. New transmission standards are being developed to improve the transmission rate without forfeiting compatibility with current telephone apparatus.

A dawning standard in the market is that known as ADSL (Asymmetric Digital Subscriber Line), which provides for the transmission at 4.3125 Hz spacings of carriers having an analog band upper limit of 1.1 MHz. These signals are added, through appropriate electromechanical circuits (transformers, capacitors, inductors, and resistors) to the standard telephone signal, using a so-called POTS splitting technique.

Stated otherwise, the POTS (Plain Old Telephone Set) function is served by conventional integrated circuits of the SLIC type, as described in this Applicant's U.S. Pat. Nos. 5,440,612 and 5,612,998, for example.

On the other hand, the ADSL function is made possible by circuits of a new design which are adapted to transmit, receive and decode this type of a signal.

Furthermore, there exists a subset of the ADSL specifications, referred to as ADSL_Lite, which being somewhat inferior in performance, and less expensive for the user, allows data to be transmitted at a rate of 1.5 Mbits/sec in a 550 kHz analog band. The ADSL_Lite specification is presently a subject for debate, and the service providers anticipate POTS splitting as well as other solutions.

In particular, some manufacturers plan to adopt a solution derived from the solid state electronic circuits of the SLIC type as currently employed on the subscriber boards to have the speech signals and ADSL signals added together upstream of the line drive circuit portion.

However, this solution does not seem practicable with conventional line drive portions, since these involve handling the high-frequency signals by the same circuits which are to handle the necessarily high voltages (about 160V) used for the line supply and the call signals.

In fact, current technologies are inadequate to provide elementary components which can be operated at high voltages and good rates. Consequently, the objectives of the ADSL_Lite specification cannot be achieved without a POTS splitting function.

SUMMARY OF THE INVENTION

Embodiments of the invention provide an integrated circuit with suitable structural and functional features to drive a two-wire telephone line for transmitting digital data at a very high rate, thereby overcoming the drawbacks with which prior solutions are beset.

Therefore, embodiments of the invention supply to the pair of final amplifier stages connected to a respective lead of the two-wire line, a respective signal in phase opposition, so as to obtain at the output an AC+DC differential voltage for driving the telephone line. Thus, the two outputs of the driver circuit are coupled to the input signals.

Based on this principle, presented is a device for deriving a reference voltage from the supply voltage, and including a low-voltage supply network being input a DC signal and producing a voltage reference to be added to said reference voltage for delivery to one input of each output stage, the other input of each stage receiving an AC signal in order to present at the circuit output a suitable AC+DC differential voltage for driving the telephone line.

The features and advantages of a circuit according to the invention will become apparent from the following description of an embodiment thereof, given by way of example and not of limitation with reference to the accompanying drawings.

DETAILED DESCRIPTION

Figure 1:
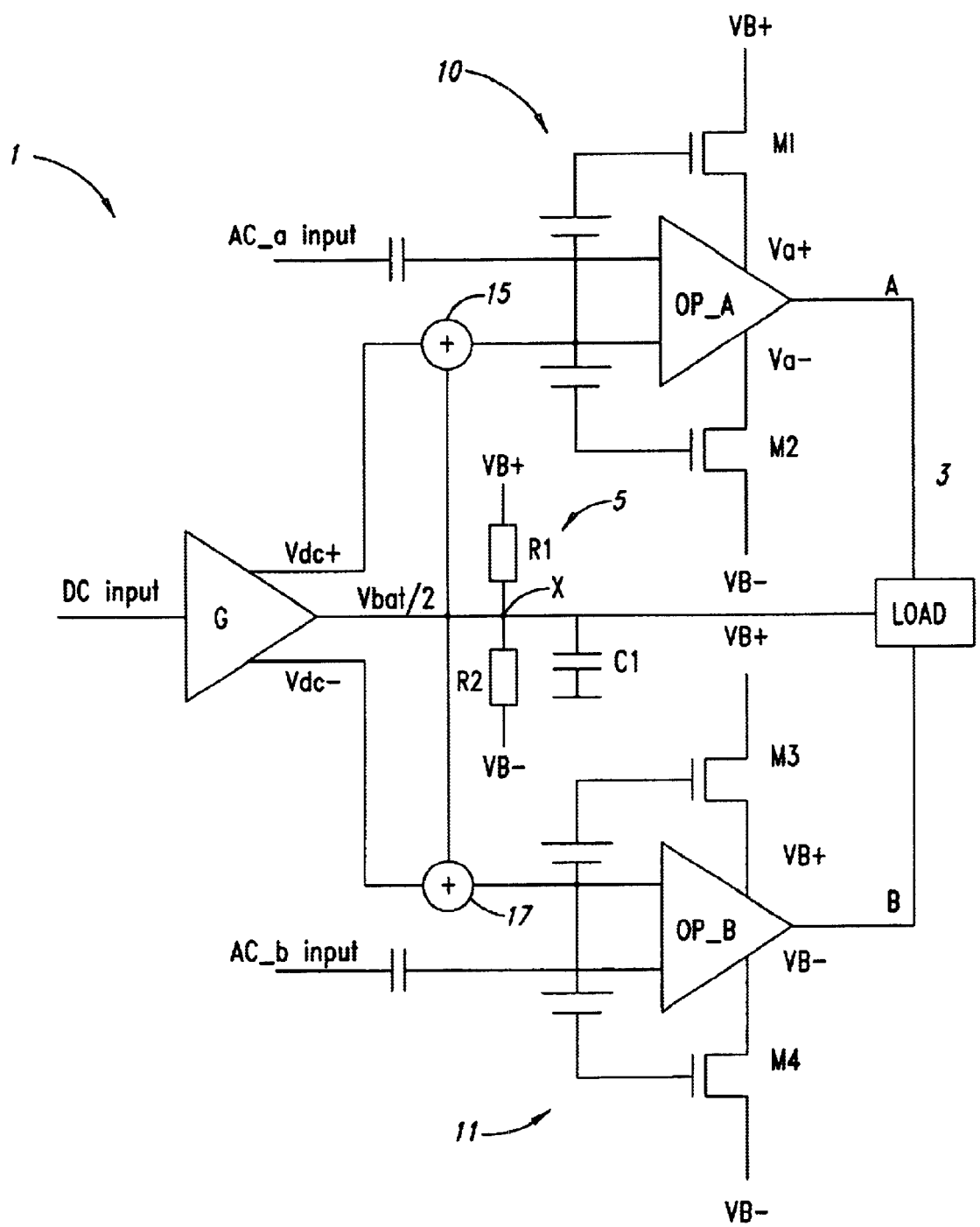
FIG. 1 is a schematic diagram of a portion of an integrated driver circuit for a two-wire telephone line, according to an embodiment of this invention.

Referring to the drawing figures, in particular to FIG. 1, a portion of a monolithically integrated SLIC (Subscriber Line Interface Circuit) is generally shown at 1 as installed to a telephone exchange.

The circuit 1 is powered from a battery sourcing two voltage references VB+ and VB−, and has its output connected to a two-wire telephone line linking a subscriber's set and including a pair of leads A and B.

Provided within the interface circuit 1 is a bridge circuit structure which includes two final amplifier stages 10, 11 having the line 3, and the apparatus linked thereto, connected as a load therebetween. In the presence of a signal, these amplifiers will drive the line in phase opposition.

The circuit 1 drives the line 3 through an output pair, namely a first terminal (TIP) connected to the lead A and a second terminal (RING) connected to the lead B. These outputs are respectively supplied line currents and voltages.

The circuit 1 is constructed of two separate circuit portions, each having predetermined operational characteristics to be described.

More particularly in this embodiment, the output circuit portion of the circuit 1 comprises an essentially bridge type of structure which draws voltage from the DC battery supply sourcing the values VB+ and VB− and from a potential reference node X provided internally of the circuit 1 to supply the value Vbat/2.

The circuit 1 supplies the line 3 with a DC voltage in compliance with applicable standards. An output amplifier, referenced G, is input a DC reference signal which is used to create a floating supply for the amplifier, the latter being therefore connected in a low-voltage network.

The output circuit portion of the circuit 1 is shown in FIG. 1 to comprise a pair of output stages 10, 11, one for each line terminal TIP and RING.

The stages 10, 11 include an operational amplifier each, OP_A for the line A and OP_B for the line B. Each amplifier in the stages 10, 11 is supplied the battery references VB+ and VB− through respective MOS transistors with buffer function which are connected to the amplifiers in a source-follower configuration.

Shown in FIG. 1 are the buffer transistors M1, M2 for the stage 10 and the buffer transistors M3, M4 for the stage 11.

The amplifier OP_A of the stage 10 receives, on a signal input thereof, a signal AC_a which comprises a speech band and a band in the ADSL_Lite specification, while the amplifier OP_B of the stage 11 receives a signal AC_b on a signal input thereof.

Compared to prior solutions, the circuit of this embodiment has the output stages 10, 11 supplied with a low voltage. In the prior art, these stages were instead supplied the maximum supply voltage.

Thus, the AC signal comprising the speech band and the ADSL_Lite band is applied to the respective inputs of the output stages 10, 11 through a DC decoupling network. This decoupling network may be a simple capacitor connected upstream of each input.

Furthermore, by separating the AC and DC signal paths, it becomes possible to optimize the circuit portions that are to handle these signals.

The output circuit portion includes a device 5 effective to generate a voltage being one half the voltage from the circuit 1 supply battery. This device comprises essentially a resistive divider formed of a pair of resistors R1, R2. The interconnection node X between the two resistors is taken to a ground voltage reference through a capacitor C1 which is used to suppress noise from the battery supply voltages VB+ and VB−.

The output amplifier G generates two voltages Vdc+ and Vdc− in phase opposition, having suitable gains, from the DC input signal.

The voltage values Vbat/2 and Vdc+ are added together in a summing node 15 provided upstream of an input of the output stage, and represent the DC reference for the first output stage 10 having the amplifier OP_A. Likewise from the voltages Vbat/2 and Vdc−, a reference voltage is generated in another summing node 17 for the second output stage 11 having the amplifier OP_B.

Two additional voltages are derived from these reference voltages, namely Va+, Va− for the first stage 10, and Vb+, Vb− for the second stage 11. The voltages Va+, Va− are supplied, as suitably buffered through the transistors M1, M2, to the operational amplifier OP_A, and the voltages Vb+, Vb−, suitably buffered through the transistors M3, M4, are supplied to the operational amplifier OP_B.

The excess difference of potential relative to the overall supply voltage (|VB+|+|VB−|) will locate at the opposite ends of the buffer transistors associated with the operational amplifiers OP_A and OP_B. The DC voltage on the leads A and B will be the same value as Vbat/2, if the voltage applied to the DC input of the output amplifier G is zero.

As the input DC voltage increases, the voltage on the lead A tends to the value VB+, and that in the lead B tends to the value VB−.

Figure 2:
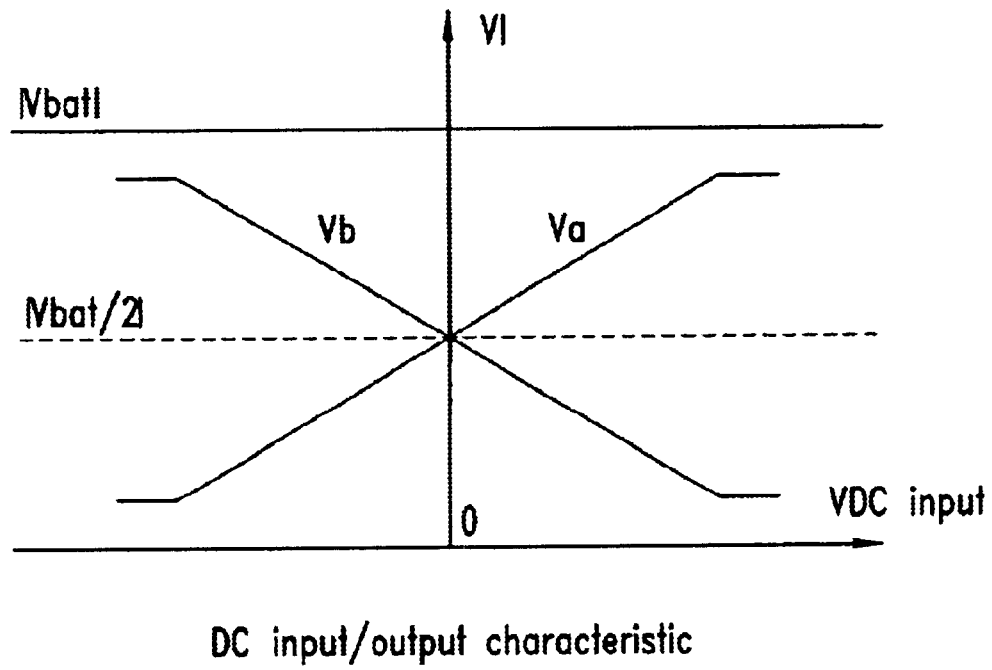
FIG. 2 is a voltage vs. voltage plot showing graphically the input and output DC voltage values for the circuit of FIG. 1.

By contrast, when the value of the input DC voltage to the output amplifier G is negative, a reverse shift of the two leads will occur as shown schematically in FIG. 2.

When the two operational amplifiers OP_A, OP_B are supplied a signal in phase opposition, to the signal inputs AC_a and AC-b, an AC+DC differential voltage is obtained at the output which is suitable to drive the telephone line 3.

This embodiment of the invention, by using the intermediate node X to the reference potential Vbat/2, allows the outputs A, B to be directly related to the input signals. Thus, the circuit 1 can also have polarity reversal and injection functions in the lead RING by applying a suitable signal to the DC input of the output amplifier G.

The circuit 1 can also be operated under such hard conditions as the occurrence of lightning and power cross situations, both events being quite trying for the output stages 10, 11.

It will be appreciated from the foregoing that, whereas specific embodiments of the invention have been described for illustrative purposes, many modifications could be made unto the invention without departing from its spirit and scope. Accordingly, the invention is to be only limited by the scope of the following claims.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. A monolithically integrated telephone circuit for driving wide-band telephone lines and transmitting digital data at a very high frequency, the telephone circuit powered from a battery DC supply providing a first and a second voltage reference, and comprising:

an output circuit portion including a pair of differential output stages each having a pair of inputs and being connected with its output to a respective lead of a two-wire telephone line;

a device for deriving a third reference voltage from the battery DC supply;

a low-voltage supply network having an input terminal structured to accept a DC signal and produce a fourth and fifth voltage reference to be added to said third reference voltage for delivery to one input of each differential output stage; and the other input of each output differential stage structured to receive an AC signal in order to, between the pair of differential output stages, provide an AC+DC differential voltage for driving the two-wire telephone line.

2. The telephone circuit according to claim 1, wherein the low-voltage supply network includes an output amplifier having an input structured to receive the DC signal and operable to produce the fourth and fifth voltage reference in a floating supply, in phase opposition to the output amplifier.

3. The telephone circuit according to claim 1, wherein each differential output stage is coupled between the first and second voltage references through respective MOS buffer transistors which are connected to the respective output differential stages in a source-follower configuration.

4. The telephone circuit according to claim 1, wherein the device for deriving the third reference voltage is a resistive divider, comprising at least a resistor pair.

5. The telephone circuit according to claim 4, further comprising an interconnection node between the resistor pair, the interconnection node coupled to a ground voltage reference through a filtering capacitor.

6. The telephone circuit according to claim 1, wherein the AC signal applied to the other input of each differential output stage comprises a speech band and a band of the ADSL-Lite type.

7. The telephone circuit according to claim 6, wherein said AC signal is applied to respective inputs of the differential output stages through a DC decoupling network.

8. The telephone circuit according to claim 7, wherein said DC decoupling network comprises a capacitor connected in series with each respective input of the differential output stages.

9. The telephone circuit according to claim 1, wherein said AC signals applied to respective inputs of the differential output stages are in phase opposition.

10. The telephone circuit according to claim 1, further comprising a summing node connected to each respective input to the differential output stages that is coupled to the third reference voltage.

11. A telephone circuit for driving a telephone line having a first and a second telephone wire, the telephone circuit comprising:

a first DC voltage reference;

an amplifier structured to accept a DC input and provide a first and a second dc voltage signal in phase opposition to one another;

a first and a second differential amplifier, each having a first input terminal, a second input terminal and an output terminal, the output terminal of the first differential amplifier coupled to the first telephone wire, and the output terminal of the second differential amplifier coupled to the second telephone wire;

a first summing node coupled to the first input of the first differential amplifier and structured to add the first DC voltage reference to the first dc voltage signal;

a second summing node coupled to the first input of the second differential amplifier and structured to add the first DC voltage reference to the second dc voltage signal;

a first ac signal coupled to the second input of the first differential amplifier; and a second ac signal coupled to the second input of the second differential amplifier.

12. The telephone circuit of claim 11 further comprising:

a first MOS transistor coupled between a second DC voltage reference and the first differential amplifier;

a second MOS transistor coupled between the first differential amplifier and a third DC voltage reference;

a third MOS transistor coupled between the second DC voltage reference and the second differential amplifier; and a fourth MOS transistor coupled between the second differential amplifier and the third DC voltage reference.

13. The telephone circuit of claim 1 further comprising:

a resistive voltage divider having a first and a second resistor each having a first and a second terminal, the first terminal of the first resistor coupled to the second DC voltage reference, and the second terminal of the first resistor coupled to the first DC voltage reference; and the first terminal of the second resistor coupled to the first DC voltage reference, and the second terminal of the second resistor coupled to the third DC voltage reference.

14. The telephone circuit of claim 11 further comprising a first capacitor coupled between the first DC voltage and a ground voltage reference.

15. The telephone circuit of claim 11 further comprising:

a first capacitor coupled between the first ac signal and the second input of the first differential amplifier; and a second capacitor coupled between the second ac signal and the second input of the second differential amplifier.

16. A method of driving a telephone line having a first wire and a second wire, the method comprising:

accepting a DC signal, and a first and second ac signal;

amplifiying the DC signal and converting it into a first dc voltage and a second dc voltage, the first and second dc voltages in phase opposition to one another;

adding the first dc voltage to a dc reference to generate a first dc combination signal, and providing the first dc combination signal to a first terminal of a first operational amplifier;

adding the second dc voltage to the dc reference to generate a second dc combination signal, and providing the second dc combination signal to a first terminal of a second operational amplifier;

providing the first ac signal to a second terminal of the first operational amplifier;

providing the second ac signal to a second terminal of the second operational amplifier; and providing an output of the first operational amplifier to the first wire of the telephone line;

providing an output of the second operational amplifier to the second wire of the telephone line.

17. The method of claim 16 further comprising:

coupling the first and second operational amplifiers between a first dc voltage reference and a second dc voltage reference.

* * * * *